United States Patent [19]

Vitkuske et al.

[11] Patent Number: 4,585,816

[45] Date of Patent: Apr. 29, 1986

[54] ASPHALT-BLOCK COPOLYMER ARTICLES AND METHOD FOR THE PREPARATION THEREOF

[75] Inventors: John F. Vitkuske; Lu H. Tung, both of Midland, Mich.

[73] Assignee: The Dow Chemical Company, Midland, Mich.

[21] Appl. No.: 751,152

[22] Filed: Jul. 2, 1985

[51] Int. Cl.$^4$ .......................... C08J 3/20; C08L 53/02; C08L 95/00
[52] U.S. Cl. ........................................ 524/68; 523/351
[58] Field of Search ........................... 524/68; 523/351

[56] References Cited

U.S. PATENT DOCUMENTS

| | | | |
|---|---|---|---|
| 4,490,493 | 12/1984 | Mikols | 524/68 |
| 4,503,176 | 3/1985 | Barlow et al. | 524/68 |
| 4,530,652 | 7/1985 | Buck et al. | 524/68 |

*Primary Examiner*—Allan M. Lieberman
*Attorney, Agent, or Firm*—R. B. Ingraham; B. M. Kanuch

[57] ABSTRACT

Block copolymers of the AB(BA)$_n$ configuration are employed in the preparation of asphalt blend concentrates. Advantageously asphalt is blended with polymer solution from polymerization reactor and subsequently devolatilized.

8 Claims, No Drawings

ASPHALT-BLOCK COPOLYMER ARTICLES AND METHOD FOR THE PREPARATION THEREOF

Asphalt is a readily available material of low cost having physical properties adequate for many applications. However, oftentimes it is desirable that the physical properties of asphalt be improved. A number of efforts have been made to provide asphalt having improved physical properties. Many of these required the admixture of asphalt and a resinous or elastomeric block copolymer. Such block copolymers generally have an ABA configuration. Also useable are block copolymers having an AB(BA)$_n$ configuration wherein n is an integer of from 1 to 10. The A blocks are polymers and copolymers which are predominately formed from an alkenyl aromatic monomer. By the term alkenyl aromatic monomer is meant a monomer of the formula:

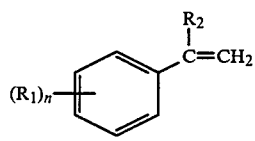

where n is an integer from 0 to 3, R$_1$ is an alkyl radical containing up to 5 carbon atoms and R$_2$ is hydrogen or methyl. Preferred alkenyl aromatic monomers include styrene, vinyltoluene (all isomers alone or in admixture), alphamethylstyrene. The B blocks desirably are elastomeric and are ploymers primarily of butadiene or isoprene of mixtures thereof. Such asphalt-block copolymer compositions are employed for a number of different applications. Typical examples of such applications are found in the following U.S. Pat. Nos.: 3,345,316; 3,440,195; 3,523,493; 3,565,842; 3,577,250; 3,611,888; 3,755,231; 3,856,732; 3,978,014; 4,032,491; 4,145,322; 4,172,061; 4,217,259; 4,250,067; 4,282,127; 4,332,703; 4,381,357; and 4,485,201; the teachings of which are herewith incorporated by reference thereto.

Generally in the preparation of such blends or mixtures of asphalt and block copolymer, considerable mechanical energy is used to obtain the desired mixture. Frequently, high temperatures and high intensity mixing apparatus is employed to form the desired blends. The blends at high temperature, particularly in the presence of air, show marked degradation of the asphalt while high shear and high temperatures lead to degradation of the block copolymer.

It would be desirable if there were available an improved method of dispersing a block copolymer in asphalt.

It would be desirable if there were provided a concentrate of block copolymer in asphalt which would more readily disperse in asphalt than block copolymers alone.

It would also be desirable if there were a method for the preparation of such a concentrate which would not require high shear and high intensity mixing.

These benefits and other advantages in accordance with the present invention are achieved in a method for the preparation of a mixture of a block copolymer of AB(BA)$_n$ configuration wherein n is an integer of from 1 to 10 comprising providing a solution of the block copolymer in a solvent, said solvent being suitable for lithium initiated polymerization of alkenyl aromatic monomer and diene monomer, mixing the solution of polymer with a liquid asphalt, to provide a generally homogenous solution of asphalt and block copolymer in the solvent; subsequently removing the solvent to provide an asphalt-block copolymer blend and shaping the resultant blend into a disired configuration.

Also contemplated in the scope of the present invention is a plurality of particles, the particles being a blend of asphalt and a block copolymer of the configuration AB(BA)$_n$ wherein n is an integer of 1 to 10, said particles having an abherent coating external to each particle.

All asphalts are suitable for use in the present invention whether they be natural or synthetic, native, rock, lake asphalts or synthetic asphalts, petroleum asphalts, air blown asphalts, highly cracked or residual asphalts. Block copolymers suitable for the practice of the present invention are well known and are readily prepared and are commercially available. A particularly desirable manner of making block copolymers is by the use of multifunctional lithium containing initiators. Multifunctional lithium containing initiators are well known in the art as is the use of such initiators in the polymerization of olefinically unsaturated hydrocarbon monomers. Such polymers and initiators are disclosed in the following U.S. Pat. Nos. 3,660,536; 3,663,634; 3,668,263; 3,684,780; 3,725,368; 3,734,973; 3,776,893; 3,776,964; 3,784,637; 3,787,510; 3,954,894; 4,172,100; 4,172,190; 4,182,818; 4,196,153; 4,196,154; 4,200,718; 4,201,729; 4,205,016; the teachings of which are herewith incorporated by reference thereto.

Diene monomers suitable for the practice of the present invention include 1,3-butadiene, isoprene and mixtures thereof. The block copolymers employed in the present invention are dissolved or polymerized in a suitable solvent, such as for example hexane, cyclohexane, heptane and the like prior to admixture with the asphalt. A particularly desirable method of preparation of blends in accordance with the present invention is to polymerize the block copolymer in the solvent, mix the resultant polymer solution with asphalt and subsequently remove solvent from the asphalt polymer mixture. Such a procedure eliminates the need of isolating the block copolymer and in effect considerably reduces the energy required to obtain the blend of asphalt and block copolymer. Beneficially the molecular weight of the block copolymer is between 30,000 grams per mole and 500,000 grams per mole. Advantageously the molecular weight is from about 50,000 to 300,000 grams per mole. The polydiene content of the block copolymer is from about 50 weight percent to 90 weight percent with a preferred range of 55 to 85 weight percent. The polydiene block is a polymer of butadiene, isoprene and mixtures thereof with a vinyl aromatic monomer content not exceeding 20 weight percent of the polydiene block. Tapered block copolymers are also useful in the practice of the present invention. The vinyl aromatic block can be polystyrene, polymethylstyrene, polyalphamethylstyrene, polytertiarybutylstyrene or copolymers of monomers used to prepare such blocks. The proportions of the blend range from 1 part of asphalt to 10 parts block copolymer to 40 parts of asphalt per 10 parts of block polymer. The preferred range of asphalt content is about 3 parts of asphalt per 10 parts of block copolymer to 20 parts of asphalt to 10 parts of block polymer. In the event that fillers, extending oil and stabilizers and other ingredients are added, the total weight should not exceed 1 part by weight per 1 part by weight of the block copolymer. Additives that can be included can be added to the asphalt-block copolymer blend include calcium carbonate, silica, glass fibers, aluminum oxide and the like.

Extender oils such as the naphthenic and aromatic oils used in the rubber industry may also be added if desired.

Oligomers and polymers which may be added include polyethylene, polystyrene, poly(alpha-methylstyrene) and their oligomers as well as hydrogenated poly(alpha-methylstyrene) oligomers and copolymers of alphamethylstyrene and styrene. Various commercial antioxidants may also be added if desired.

A wide variety of abherent coatings may be employed in the practice of the present invention. The selection of the material utilized in forming the abherent coating generally is dependent upon the end use contemplated for the asphaltic blend. For many applications materials such as sand, clay, calcium carbonate, silica, aluminum oxide, mica, talc and the like may be utilized. Such materials desirably are applied in a dry pulverant form generally by dusting or tumbling of the asphaltic material with the abherent coating forming material. For many applications it is particularly desirable and convenient to utilize particulate inorganic materials in the absence of a liquid dispersant, generally depending upon the end use contemplated for the asphaltic composition and the size of the blend employed and the amount of inert filler, such as is utilized for the preparation of the abherent coating. Such materials beneficially are those passing through a No. 12 U.S. seive size screen and advantageously for many purposes materials which pass through a No. 50 seive size screen and in cases where minimum inert material is desired, materials are selected such as powdered clay and the like which pass through a No. 325 U.S. seive size screen. Alternatively, organic abherent coatings may be utilized such as water or lower alcohol soluble polymers, for example hydroxyl propyl ethyl cellulose utilizing water or lower alcohol soluble polymers such as cellulose derivatives and the like. The quantity of material in the abherent coatings may be minimized. Beneficially such coating may be accomplished by spraying a solution of the polymer into a fluidized bed of the asphaltic particles. The size of the asphaltic copolymer blend particles may vary within wide limits depending upon the end use application. Typically, such particles can range in average dimensions from about one-half inch to particles passing through a No. 3 mesh U.S. seive size screen and those passing through a No. 325 U.S. seive size screen.

Blends in accordance with the present invention may be used in some instances such as roofing applications. Usually in such applications, the final block copolymer content of the asphalt composition employing the concentrates in accordance with the invention will be relatively low. Concentrates in accordance with the invention having a relatively high block copolymer content are suitable for molding both injection and compression as well as extrusion and provide an asphalt filled thermoplastic elastomer. Block copolymer compositions in accordance with the present invention are readily blended with asphalt with low shear mixing provide minimal elastomer degradation and minimal asphalt oxidation.

By way of further illustration, a solution of a block copolymer commercially available under the designation of Kraton D-1102 having an ABA configuration containing 28 weight percent styrene and 72 weight percent butadiene polymerized therein has a melt index of 6 under condition G. The solvent employed was toluene and the elastomer dissolved in the toluene after shaking overnight. 50 grams of a commercially available asphalt sold under the trade designation of Marathon AC-10 having a penetration value of 74 was heated to a temperature of 140° C., was slowly poured into 167 grams of the elastomer-toluene solution at a temperature of about 90° C. in a beaker which was magnetically stirred. The mixture was stirred and heated to 150° C., maintained at that temperature for a period of about 30 minutes. At the end of 30 minutes, the mixture visually appeared to be homogenous. The mixture was then poured into an aluminum foil container. The container and mixture was then placed in a vacuum oven at a temperature of 140° C. and was subjected to a vacuum for a period of about 2 hours to remove residual toluene. The elastomer asphalt blend was cooled to ambient temperature and cut into pieces having roughly the configuration of a cube. 90 grams of hereinbefore described asphalt was placed in a beaker, heated to 140° C. and stirred magnetically. 10 grams of the elastomer asphalt blend were added to the beaker containing asphalt and a spatula was employed as a baffle to minimize the formation of a vortex in the beaker. The temperature of the contents of the beaker was raised to 170° C. over a period of about 30 minutes. At the end of this time the beaker contents were completely homogenous.

For purposes of comparison 5 grams of the Kraton D-1102 were added to 95 grams of the hereinbefore described asphalt at a temperature of 170° C. for a period of 30 minutes. At the end of 30 minutes, the elastomer pellets were still intact and appeared to have the same dimension as before they were added to the asphalt.

Similar advantageous results were obtained when a rubber solution from a polymerization is employed to form pellets in accordance with the present invention and the resulting mixture passed through a devolatilizing extruder, extruded as strands to subsequently cut into pellets and desirably treated with an abherent such as finely divided talc which forms an abherent coating external to each pellet.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a mixture of a block copolymer of $AB(BA)_n$ configuration wherein n is an integer of from 1 to 10 and asphalt comprising: providing a solution of the block copolymer in a solvent, said solvent being suitable for lithium initiated polymerization of alkenyl aromatic monomer and diene monomer, said solution being that obtained from the polymerization of the A and B blocks to prepare the $AB(BA)_n$ copolymer in solution in said solvent, mixing the solution of polymer with a liquid asphalt to provide a generally homogenous solution of asphalt and block copolymer in the solvent; subsequently removing the solvent to provide an asphalt-block copolymer blend, shaping the resultant blend into a desired configuration, wherein the blend contains from about 1 part of asphalt to about 10 parts of copolymer to about 40 parts of asphalt to about 10 parts of copolymer, wherein said block B is a diene and block A is a vinyl aromatic, and wherein the B block comprises from about 50 to 90 weight percent and the A block ranges from 10 to about 50 weight percent of the block copolymer.

2. The method of claim 1 wherein the configuration of the shaped asphalt block copolymer blend is a plurality of particles.

3. The method of claim 2 including the additional step of providing an adherent coating suitable for the end use contemplated for said asphalt block copolymer blend on said particles.

4. The method of claim 1 wherein the B block of the copolymer contains a block of a polymer containing a polymer of 1,3-butadiene, or isoprene and mixtures thereof.

5. The method of claim 4 wherein the A block is a polymer selected from the group consisting of styrene, methylstyrene, alphamethylstyrene, tertiaryl butyl styrene and copolymers of these monomers.

6. The method of claim 1 wherein the asphalt content is about 3 parts asphalt per 10 parts copolymer to about 20 parts asphalt to about 10 parts copolymer.

7. The method of claim 1 wherein in addition mixing into the composition an extending oil, the total weight not exceeding 1 part by weight of extending oil to 1 part by weight of block copolymer.

8. A plurality of particles, the particles being a blend of asphalt and a block copolymer of the configuration $AB(BA)_n$ wherein n is an integer of 1 to 10, said particles having an abherent coating suitable for the end use contemplated for the blend of asphalt and said block copolymer external to each particle wherein said blend contains from about 1 part of asphalt to about 10 parts of copolymer to about 40 parts of asphalt to about 10 parts of copolymer, wherein block B of said block copolymer is a diene and block A of said block copolymer is a vinyl aromatic, and wherein the B block comprises from about 50 to 90 weight percent and the A block ranges from 10 to about 50 weight percent of the block copolymer.

* * * * *